US008976969B2

(12) United States Patent
Elenes et al.

(10) Patent No.: US 8,976,969 B2
(45) Date of Patent: Mar. 10, 2015

(54) DELAYING ANALOG SOURCED AUDIO IN A RADIO SIMULCAST

(75) Inventors: Javier Elenes, Austin, TX (US); Dana Taipale, Austin, TX (US); Dave Anderton, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 700 days.

(21) Appl. No.: 13/172,208

(22) Filed: Jun. 29, 2011

(65) Prior Publication Data

US 2013/0003801 A1 Jan. 3, 2013

(51) Int. Cl.
*H04L 27/00* (2006.01)
*H04H 40/18* (2008.01)

(52) U.S. Cl.
CPC ........... *H04H 40/18* (2013.01); *H04H 2201/18* (2013.01)
USPC ................................ 381/2; 370/428; 370/487

(58) Field of Classification Search
CPC ..................... H04L 27/2656; H04L 25/03006; H04L 49/90; H04L 49/9094; H04H 60/11; H04H 60/12; H04H 60/13; H04H 60/1425
USPC ............ 381/2; 455/503, 243.1, 244; 375/224, 375/254, 316; 370/429, 487
See application file for complete search history.

(56) References Cited

U.S. PATENT DOCUMENTS 4,696,052 A * 9/1987 Breeden ........................ 455/503
5,873,062 A 2/1999 Hansen et al.
6,144,705 A 11/2000 Papadopoulos et al.
6,671,340 B1 12/2003 Kroeger et al.
6,836,520 B1 12/2004 Chen et al.
6,947,551 B2 9/2005 Givens
7,272,363 B1 9/2007 Fluker
7,400,954 B2 7/2008 Sumcad et al.
7,546,088 B2 * 6/2009 Kroeger et al. ................. 455/60
7,944,998 B2 5/2011 Shridhar et al.
7,953,183 B2 * 5/2011 Shridhar et al. .............. 375/316
8,040,989 B2 10/2011 Nekhamkin et al.
8,073,497 B2 12/2011 Fratila
2001/0003089 A1 6/2001 Kroeger et al.
2002/0115418 A1 8/2002 Wildhagen
2004/0043730 A1 3/2004 Schill et al.
2005/0113049 A1 5/2005 Takayama et al.
2006/0083380 A1 * 4/2006 Mino et al. ........................ 381/2
2006/0227814 A1 10/2006 Iannuzzelli et al.
2007/0004335 A1 1/2007 DeMoor et al.
2007/0291876 A1 12/2007 Shridhar et al.
2007/0293167 A1 12/2007 Shridhar et al.

(Continued)

*Primary Examiner* — Davetta W Goins
*Assistant Examiner* — Oyesola C Ojo
(74) *Attorney, Agent, or Firm* — Meyertons, Hood, Kivlin, Kowert & Goetzel, P.C.

(57) ABSTRACT

A method and apparatus is disclosed in which delay is applied to analog-sourced audio in a radio simulcast when the analog signal initially leads the digital signal. A radio receiver is configured to receive a simulcast radio program broadcast with an analog signal and a digital signal. The program content can be extracted from either the analog or digital signals, with the audio source eventually being blended to the digital signal. Audio is initially provided based on the analog signal. If the analog signal is initially leading the digital signal, delay is applied a data stream corresponding to the analog signal relative to a data stream corresponding to the digital signal. Delay applied to the data stream corresponding to the analog signal is increased at a rate that avoids audio artifacts of the output audio. The blend is performed when the data streams are aligned in time.

17 Claims, 10 Drawing Sheets

(56) References Cited

U.S. PATENT DOCUMENTS

2009/0258640 A1 10/2009 Persson et al.
2010/0027719 A1* 2/2010 Pahuja .......................... 375/340
2010/0100923 A1* 4/2010 Toiyama ....................... 725/131
2012/0028567 A1 2/2012 Marko
2012/0189070 A1 7/2012 Kroeger

* cited by examiner

300

DELAYING ANALOG SOURCED AUDIO IN A RADIO SIMULCAST

RELATED APPLICATIONS

The present application is related to the following applications filed concurrently herewith: U.S. application Ser. No. 13/172,110 entitled "Dynamic Time Alignment of Audio Signals in Simulcast Radio Receivers"; U.S. application Ser. No. 13/172,260 entitled "Delay Adjustment using Sample Rate Converters"; and U.S. application Ser. No. 13/172,290 entitled "Delay Estimation based on Reduced Data Sets".

BACKGROUND

1. Field of the Invention

This invention relates to radio receivers, and more particularly, radio receivers capable of simultaneously receiving content broadcast on analog and digital broadcast channels.

2. Description of the Related Art

In recent years, digital radio has emerged as an alternative to analog-only radio broadcasting. For example, the introduction of what was originally known as hybrid digital radio (hereinafter "HD radio") enabled radio programming to be broadcast in both analog and digital formats. Furthermore, the programming may be simultaneously broadcast (sometimes referred to as "simulcast") in both analog and digital formats. Radio receivers may be designed to receive both of these formats, and may utilize the analog data or the digital data based on various factors.

In one example of an HD radio simulcast, an audio program may be transmitted in analog format on an FM (frequency modulated) carrier signal. The audio program may be simultaneously broadcast in digital format in sidebands occurring on either side of the FM signal. The digital format may include a number of subcarriers modulated using quadrature phase shift keying (QPSK) and multiplexed using orthogonal frequency division multiplexing (OFDM). Often times, the HD radio receiver will first acquire the FM signal and subsequently, the digital signal. Audio may begin playing on the receiver using data extracted from the FM signal. A blend operation may then be performed to blend audio extracted from the FM signal with audio extracted from the digital signal. At the end of the blend process, the audio playback may be entirely based on the digital signal, unless the digital signal fades. Should the digital signal fade, then the analog signal may be used as a backup mechanism for continuing to receive the programming. Should the digital signal be re-acquired, the blend operation may be repeated.

In the above example, the delay between the analog and digital signals may be inherent due to the multi-second processing delay required for transmission of OFDM signals. Accordingly, broadcasters of HD radio content may delay to the transmission of the analog FM signal by a static amount of time in order to align the analog and digital signals at the receiver.

SUMMARY OF THE DISCLOSURE

A method and apparatus for performing dynamic time alignment of program content extracted from analog and digital radio signals of a simulcast is disclosed. In one embodiment, a delay estimation unit of a radio receiver is configured to dynamically determine an amount of delay between analog-transmitted and digital-transmitted portions of a received simulcast radio program. The received delay may be determined based on respective data streams corresponding to the analog and digital portions. An internal delay may be applied to at least one of the data streams to bring it into time alignment with the other data stream. Upon the data streams becoming substantially aligned in time, a blend operation transitioning to audio sourced from the analog portion to audio sourced from the digital portion may be performed. If the data streams are substantially aligned in time, the blend operation may be performed without generating audible audio artifacts.

The delay may be determined by a delay estimation unit configured to filter and decimate the data streams to produce decimated data streams having a reduced amount of data per unit time. Correlation of the decimated data streams may be performed to determine which of the data streams is leading. Delay may be applied to the leading data stream in various ways, including adjusting the output sampling rate of a sample rate converter or varying a pointer separation of a first-in, first-out memory (FIFO).

Upon receiving a simulcast radio signal, a receiver may initially provide low-latency audio from the analog source. In the case where the analog source is leading the digital source, delay may be applied incrementally to the analog data stream to align it with the digital data stream at a rate that does not generate audible audio artifacts. Upon the data streams becoming sufficiently aligned in time, the blend operation may be performed.

BRIEF DESCRIPTION OF THE DRAWINGS

Other aspects of the disclosure will become apparent upon reading the following detailed description and upon reference to the accompanying drawings in which.

Figure 1:
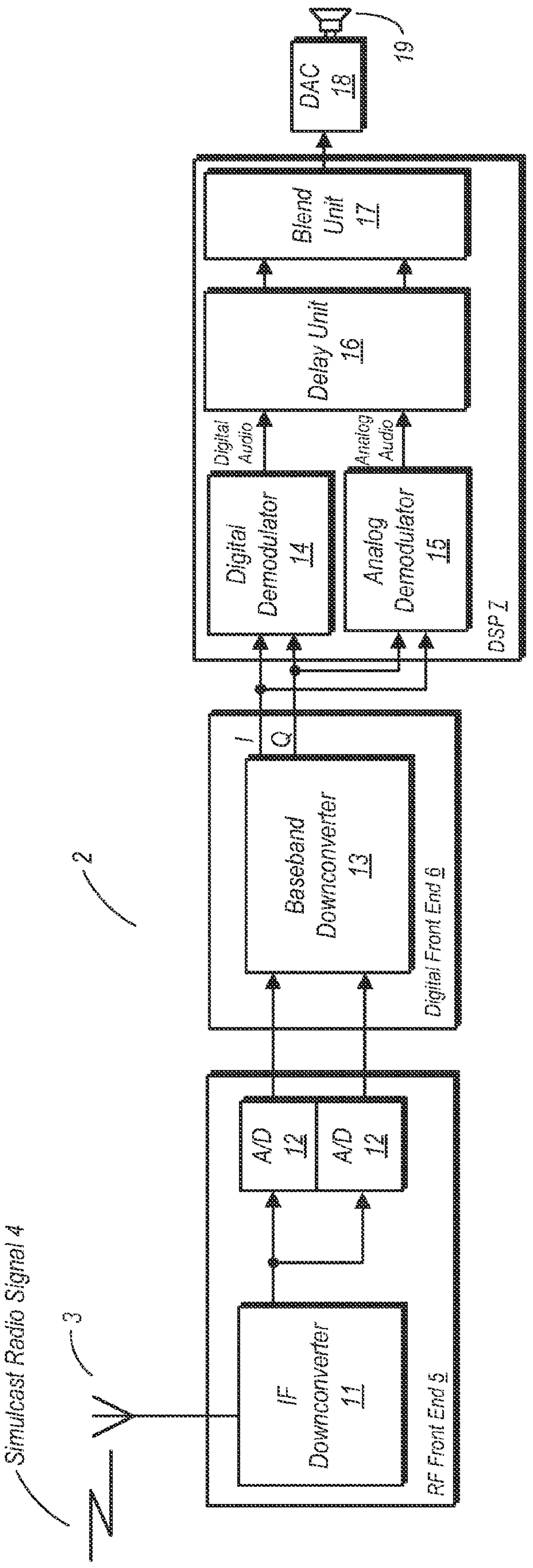
FIG. 1 is a block diagram illustrating one embodiment of a radio receiver configured to receive programming simulcast on analog and digital radio channels.

While the concepts described herein are susceptible to various modifications and alternative forms, specific embodiments thereof are shown by way of example in the drawings and in the accompanying detailed description. It should be understood, however, that the drawings and description are not intended to limit the disclosure to the particular forms disclosed, but, on the contrary, are intended to cover all modifications, equivalents, and alternatives falling within the spirit and scope of the disclosed embodiments and the appended claims.

DETAILED DESCRIPTION

The present disclosure is directed to various method and apparatus embodiments for dynamically adjusting the delay between radio content extracted from an analog radio signal and a digital radio signal from a radio simulcast. As used herein, the term "simulcast" may refer to a radio program that is broadcast from a transmitter on both an analog radio signal (e.g., such as a frequency modulated, or FM signal) and a digital radio signal (e.g., the digital portion of an HD radio signal), such that two formats of the same program content are available to a corresponding HD receiver. It should be noted that the term "simulcast" is not meant to connote that the program content transmitted on the analog radio signal is necessarily broadcast in precise synchronization with that transmitted on the digital radio signal (something that may not be achievable under real-world conditions). Instead, there may be some inherent delay existing between the program content transmitted on the analog radio signal and that which is transmitted on the digital radio signal. However, despite the best intentions and efforts of the broadcaster, the program material carried on the analog and digital channels may still exhibit some relative delay. The residual delay may result from a variety of root causes, such as: systemic errors in time alignment between the analog and digital signals, differences in signal processing applied to the analog and digital paths (e.g., companding, pre-emphasis, equalization, etc.), differences in propagation delay between studio and transmitter, etc. The present disclosure is thus directed to performing a blend operation from the analog source to the digital source to be performed without producing audio artifacts that are discernible to the listener.

In one embodiment, digital radio signals, such as those broadcast as part of an HD radio signal, may transmit information on subcarriers in a signal that utilizes OFDM. Before the program content transmitted on a digital radio signal can be converted into audio, the information contained in the subcarriers may need to be re-assembled through a time de-interleaving process. The de-interleaving process may create a delay in the content broadcast on the digital radio signal relative to the same content as broadcast on a corresponding analog radio signal. This can result an in inherent delay between the program content carried on the analog radio signal and that carried on the digital radio signal. When performing the blend operation (i.e. the transition from analog-sourced audio to digital-source audio), this delay may result in audio artifacts (e.g., echoes) that can reduce the quality of the output audio. Some broadcasters of simulcast radio programs may introduce a static delay into the program content transmitted on the analog radio signal in order to compensate for the inherent receiver delay. In other words, HD broadcasters may introduce a transmission delay into the analog portion of the signal to compensate for delays in processing the digital portion of the signal on the receiver side. This technique has not yielded ideal results in actual practice, as such static transmission delays in many cases do not result in a simulcast that can be blended from analog-sourced audio to digitally-sourced audio without noticeable artifacts. In contrast, certain embodiments disclosed herein may detect the transmission delay and adjust the time alignment between the data streams extracted from the analog and digital radio signals until they are sufficiently aligned in time such that a blend operation may be performed without causing audible audio artifacts.

In one embodiment, the detection and adjustment of the delay between the data streams as initially received may be performed by a delay estimation unit. The delay unit may include circuitry to detect which of the two data streams is leading, and further determine the amount of delay between them. The delay may be determined based on a number of samples that is a small fraction of the overall number of samples in each data stream. Based on the detected delay, the delay estimation unit may generate one or more control signals that cause the delay to be adjusted, and more particularly, to be reduced. The adjustment of the delay may be performed by various methods, such as varying the sampling rate of one or more sample rate converters, or adjusting a pointer separation in a first-in first-out memory (FIFO). The delay may also be adjusted continuously or incrementally at a rate sufficiently slow so as to avoid audio artifacts if the analog data stream leads the digital data stream. The delay estimation unit may cease adjustments when the data streams are sufficiently aligned, and provide a signal to a blend unit indicating that a blend operation may commence. Various method and apparatus embodiments that perform these functions will now be described in further detail.

Turning now to FIG. 1, a block diagram illustrating one embodiment of a radio receiver configured to receive programming simulcast on analog and digital radio channels is shown. Radio receiver 2 in the embodiment shown is a heterodyne receiver that performs a conversion of received radio frequency (RF) signals to a low intermediate frequency (IF) signal, followed by a second conversion to a baseband frequency. It is noted however that embodiments that operate on the principle of direct conversion from RF to baseband (sometimes referred to as zero-IF receivers) are possible and contemplated for use with the various method and apparatus embodiments described herein. Furthermore, while the embodiment shown here is functionally partitioned into RF front end 5, digital front end 6, and digital signal processor (DSP) 7, with various subunits in each, other partitions, both through hardware and software, are possible and contemplated.

In the embodiment shown, a simulcast radio signal 4 may be initially detected via antenna 3. As will be discussed with reference to FIG. 2, one embodiment of a simulcast radio signal may include an FM carrier signal having the RF center frequency (the analog radio signal), with upper and lower sidebands (the digital radio signal). The information, or program content of the simulcast, is modulated onto the FM carrier using analog modulation techniques and onto the sidebands using digital modulation techniques. Simulcast radio signal 4 may then be received by IF downconverter 11, which may include a low-noise amplifier and a mixer to convert the RF signal to an IF signal. The IF signal may be output in analog form from IF downconverter 11. The IF signal may be then received by analog-to-digital (A/D) converter 12 to produce a low-IF complex signal. In another embodiment, the analog and digital transmissions may occur on different frequencies in which case two independent IF converters might be employed to extract the analog and digital data streams.

The complex output of A/D converter 12 may be forwarded to baseband downconverter 13. A second mixer to convert IF signals to baseband signals may be included in baseband downconverter 13. The baseband downconverter 13 in the embodiment shown is configured to output digital versions of the respective I and Q components, as modulated at the baseband frequency.

The I and Q components of the baseband signal may be received by digital demodulator 14 and analog demodulator 15. Digital demodulator 14 may perform demodulation of the baseband signal to extract the program content as transmitted on the digital radio signal. In embodiments where the program content transmitted on the digital radio signal is multiplexed using OFDM, digital demodulator 14 may perform time de-interleaving of the data to re-assemble the original data sequence. The output of digital demodulator 14 is a first stream of digital data, referred to hereafter as the first digital data stream. Analog demodulator 15 may perform demodulation of the baseband signal to extract the program content as transmitted on the analog radio signal. The output of analog demodulator 15 is a second stream of digital data, referred to hereafter as the second digital data stream. Accordingly, the reference to "analog" or "digital" with regard to a particular data stream in this disclosure connotes the radio signal from which it was extracted, as both data streams are in a digital format at this point.

The digital and analog data streams are received from their respective demodulators by delay unit 16. Delay unit 16 in the embodiment shown is configured to dynamically determine the time alignment between the digital and analog data streams (i.e. the delay of one data stream with respect to the other). The determination made by delay unit 16 may include the amount of reception delay between the two data streams. The reception delay may be defined as that delay which is inherent between the two data streams based on the reception of their corresponding radio signals. Delay unit 16 may also determine which of the two data streams is leading (or lagging) in time with respect to the other. Based on this information, delay unit 16 may adjust an internal delay between the digital and analog data streams to align them in time. This may be accomplished by applying a delay to the data stream that is leading in time, reducing a delay to the data stream that is lagging in time, or both.

The digital and analog data streams may be received from delay unit 16 by blend unit 17. When the two data streams are sufficiently aligned in time, blend unit 17 may perform a blend operation that transitions the audio output from being analog-sourced (i.e. generated from the analog data stream) to being digitally-sourced (i.e. generated from the digital data stream). The blend operation may be performed in such a manner that it does not produce and audio artifacts detectable by a listener of the simulcast radio program. The blend operation will be described in further detail with reference to FIG. 3.

Blend unit 17 is configured to provide an output data stream. The output data stream may be provided as digital data. During the blend operation, the output data stream may include contributions from the analog data stream and the digital data stream received by blend unit 17. When not performing the blend operation, the output data stream may be based primarily on either the analog data stream or the digital data stream. The output data stream may be received by digital-to-analog converter (DAC) 18, which converts the output data stream into an analog audio signal. The analog audio signal may be received by one or more speakers 19, which then provides the program content as audio.

Figure 2:
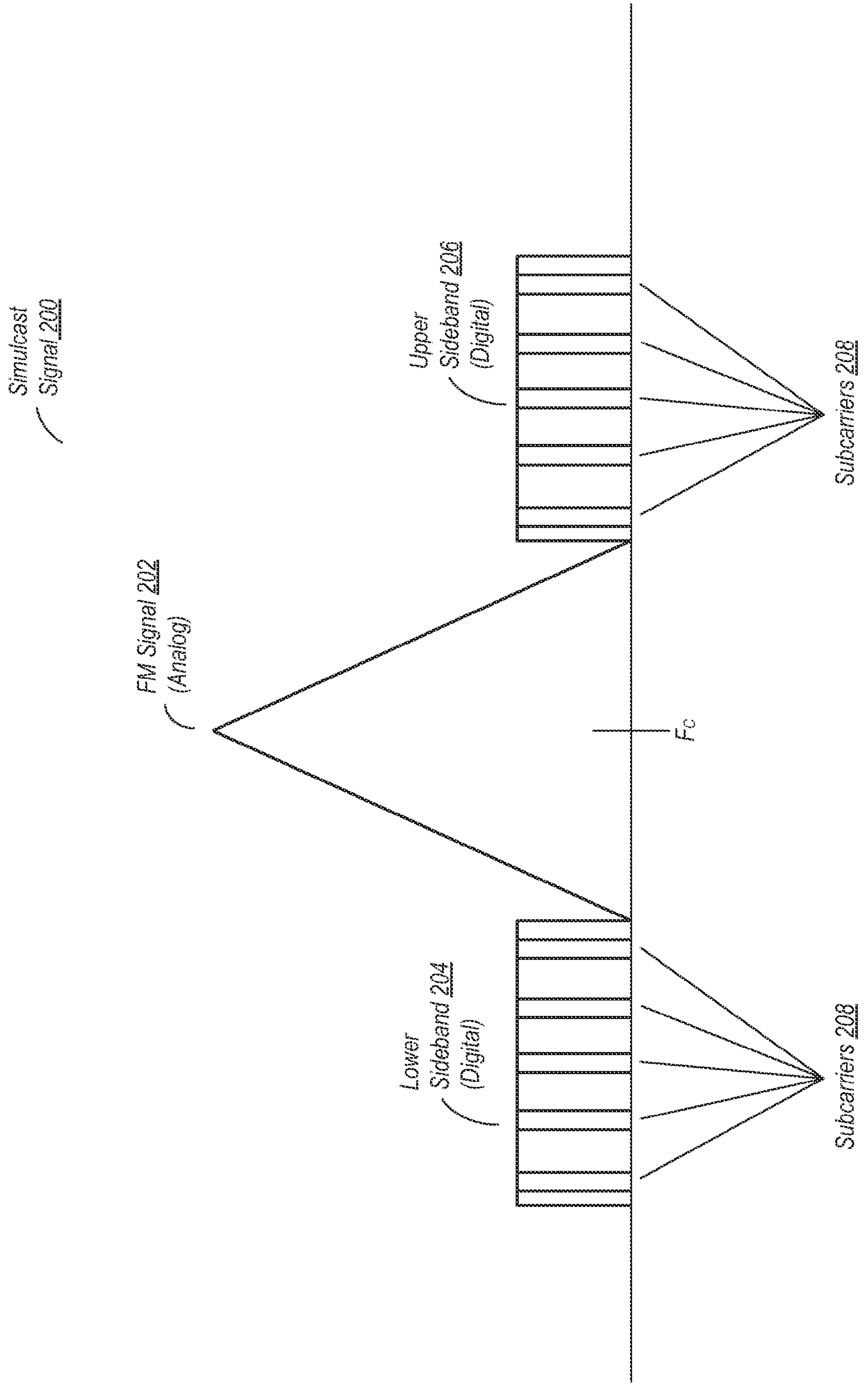
FIG. 2 is a spectral diagram illustrating the relationship of analog and digital signals received in a simulcast by an embodiment of the radio receiver of FIG. 1.

FIG. 2 a spectral diagram illustrating the relationship of analog and digital signals transmitted in a radio simulcast. In the embodiment shown, simulcast signal 200 includes FM signal 202 (the "analog radio signal"). FM signal 202 is broadcast at a carrier frequency F. The peak energy of FM signal 202 (as well as simulcast signal 200) occurs at the carrier frequency in this example. The spectral width of the FM signal 202 in this example may be approximately 200 kHz.

In addition to the analog radio signal, simulcast signal 200 also includes two sidebands, lower sideband 204 and upper sideband 206 (collectively, "the digital radio signal"). The spectral width of each of these sidebands may be approximately 100 kHz in this example. With respect to power, the ratio of FM signal 202 to the sidebands may be about 20 decibels (dB) in this example, although this ratio may vary among different embodiments.

Each sideband in the embodiment shown may include a number of subcarriers 208. During the transmission process, the information to be carried in the digital radio signal may be time interleaved into multiple data streams. These multiple data streams may be modulated using various techniques, such as quadrature phase shift keying (QSPK). Furthermore, each of the multiple data streams may be modulated at a different frequency with respect to the others. Accordingly, lower sideband 204 and upper sideband 208 may be transmitted as OFDM signals each having multiple subcarriers 208. Upon reception of the digital signal by a radio receiver, the information contained in each subcarrier may be interleaved to reconstruct the original data stream subsequent to down-conversion and demodulation.

As the depicted radio signal is a simulcast signal, the program content carried on FM signal 202 is the same as that transmitted in the combination of lower sideband 204 and upper sideband 206. Since the program content as transmitted in the sidebands is interleaved in time prior to modulation and upconversion to respective subcarrier frequencies, the program content transmitted on digital radio signal may lag in time with respect to the corresponding program content that is transmitted on the analog radio signal. Left uncorrected, this time lag can cause significant audio artifacts that are detectable by a listener during a blend operation performed by a corresponding receiver. In some cases, transmitters of simulcasts may delay the transmission of the program on the analog radio signal to attempt to compensate for this time lag. However, delaying transmission of the program on the analog radio signal may not be sufficient to prevent audio artifacts from being heard by a listener when a receiver performs a blend operation.

Figure 3:
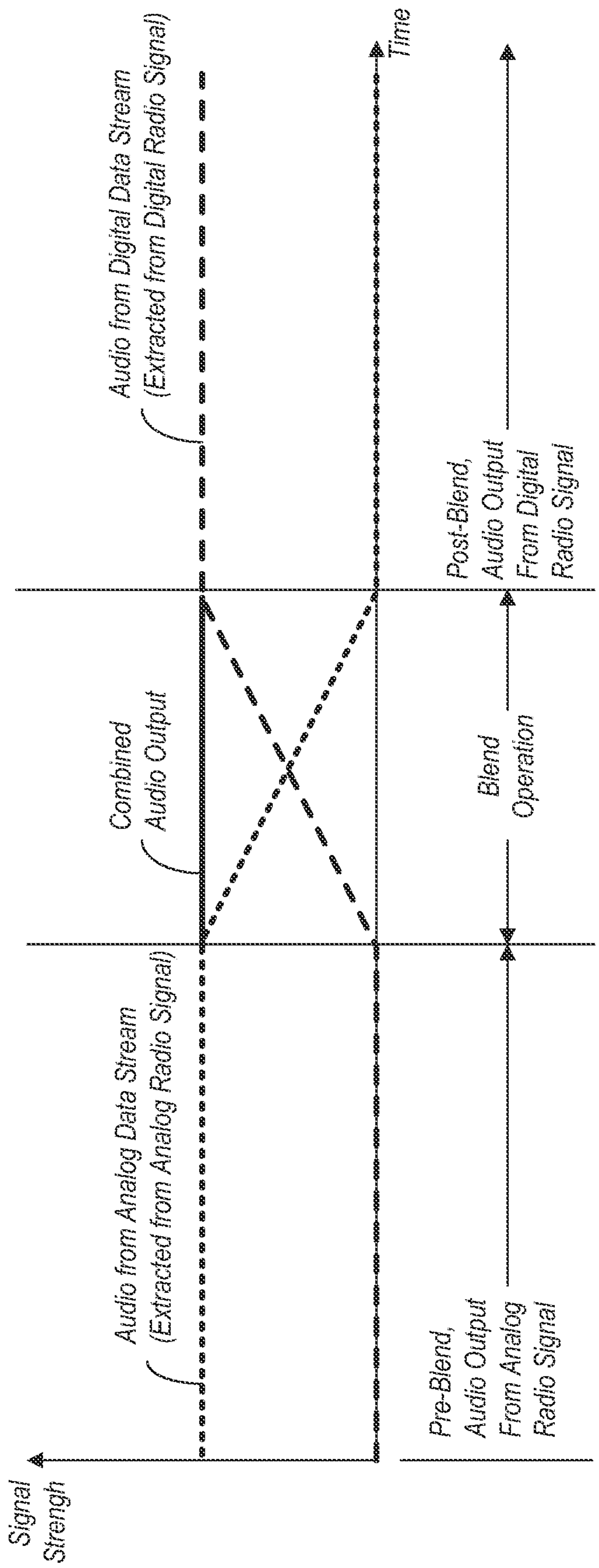
FIG. 3 is a diagram illustrating one embodiment of a blend operation.

An example of a blend operation is depicted in FIG. 3. Blend unit 17 as shown in FIG. 1 is one embodiment of hardware that may perform blend operation 300 as shown in FIG. 3. Embodiments are also possible and contemplated wherein blend operation 300 is performed by software executing on a processor. In one embodiment, the blend operation may employ linear transitions of volume between the two streams. In another embodiment, the blend operation may employ logarithmic transitions of volume. Other blend profiles are contemplated.

In the example shown, the initial audio output provided upon reception of a simulcast radio signal is provided primarily from the analog data stream ("analog-sourced audio"). Thus, most (if not all) of the signal strength of the output audio signal is based on program content extracted from the analog radio signal during the pre-blend phase.

During the blend operation, the contribution of the analog data stream to the signal strength of the output audio signal is gradually reduced. Correspondingly, the contribution of the digital data stream to the signal strength of the output audio signal ("digitally-sourced audio") is gradually increased. The gradual signal strength increase of the digitally-sourced audio with the corresponding reduction of signal strength of the analog-sourced audio may be performed in such a manner that the signal strength of the combined audio output remains relatively constant.

The blend operation may continue until the signal strength contribution of the analog-sourced audio is virtually (if not completely) eliminated. The signal strength contribution of the digitally-sourced audio may be correspondingly increased until it matches the signal strength of the analog-sourced audio as provided during the pre-blend phase. Once this point has been reached, the blend operation may be considered complete. During the post-blend phase, the audio is primarily (if not completely) digitally-sourced.

If the digital signal fades subsequent to performing the blend operation, audio output may again become analog-sourced. Embodiments of a radio receiver are possible and contemplated wherein a reverse blend operation may be performed if the bit error rate (BER) of the received digital radio signal falls below a certain threshold. Should the digital signal be subsequently re-acquired at a BER exceeding the threshold, the blend operation shown herein may be performed again to transition from analog-sourced audio to digitally-sourced audio.

Figure 4:
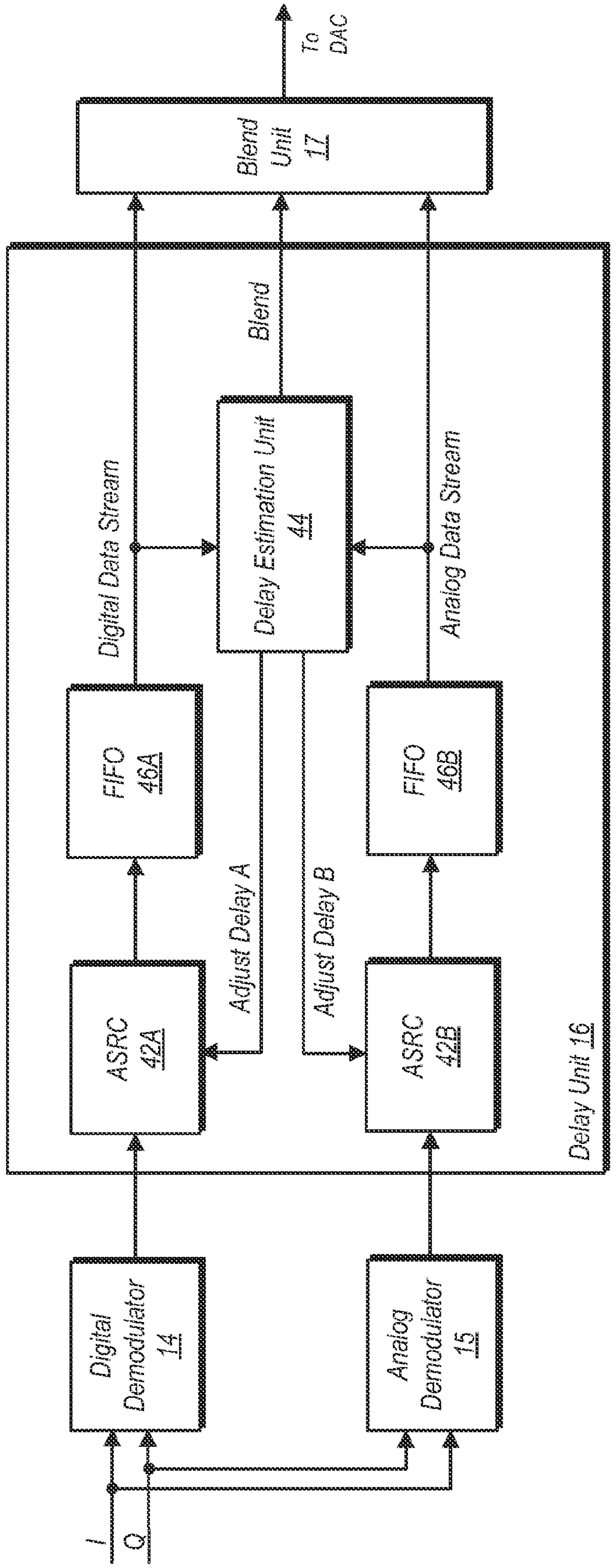
FIG. 4 is a block diagram illustrating one embodiment of a dynamic time alignment unit for aligning simulcast digital and analog programming.

FIG. 4 is a block diagram illustrating one embodiment of a delay unit. In the embodiment shown, delay unit 16 includes an asynchronous sample rate converter (ASRC) 42A coupled to receive the digital data stream from digital demodulator 14. Delay unit 16 also includes ASRC 42B, which is coupled to receive the analog data stream from analog demodulator 15. Each of ASRC 42A and 42B may receive their corresponding data streams at respective input sampling rates. The corresponding data streams may be output from each of ASRC 42A and 42B at respective output sampling rates, which may be different from the corresponding input sampling rates. For example, ASRC 42A may receive the digital data stream at an input sampling rate of 44 kHz, and may provide the digital data stream at an output sampling rate of 43.5 kHz. The respective sampling rates at which each of ASRC 42A and 42B provide their respective output data streams may be adjustable. The ability to vary the respective sampling rates of ASRC 42A and 42B may be used to adjust the time alignment between the digital and analog data streams, as will be discussed in additional detail below.

The output of ASRC 42A may be received by a FIFO 46A, while the output of ASRC 42B may be received by FIFO 46B. Each of FIFO 46A and 46B may provide temporary storage of received samples before outputting them to blend unit 17. The output rate at which each of FIFOs 46A and 46B provide samples may match a respective rate at which samples may be processed by blend unit 17.

In the embodiment shown, delay unit 16 further includes a delay estimation unit 44, which is coupled to receive each of the digital and analog data streams. More particularly, the digital and analog data streams are received by delay estimation unit 44 from FIFO 46A and FIFO 46B respectively, in this embodiment. Delay estimation unit 44 may determine a delay, or timing difference, between the digital and analog data streams. In addition, delay estimation unit 44 may determine which of the two data streams is leading the other. Based on the determination of which data stream is leading and the amount of delay between the signals, delay estimation unit 44 may generate delay adjustment signals. A first delay adjustment signal (or set of delay adjustment signals), Adjust Delay A, may be provided to ASRC 42A. A second delay adjustment signal (or set of delay adjustment signals), Adjust Delay B, may be provided to ASRC 42B. The delay adjustment signals received by a respective one of ASRC's 42A and 42B may cause it to change its output sampling rate.

Adjustment of the output sampling rates of ASRC 42A and ASRC 42B may change the delay of their respective data stream and thus alter the timing relationship therebetween. Reducing the output sampling rate of a given ASRC may add delay into the path for its respective data stream. Increasing the output sampling rate of a given ASRC may reduce delay in the path for its respective data stream. Accordingly, delay estimation unit 44 may generate delay adjustment signals to change the delay in at least one path, if not both, to change the timing relationship between the analog and digital data streams. Moreover, the changing of the delay in one or both paths may be performed in order to more closely align the analog data stream with the digital data stream. When the analog data stream and the digital data stream are sufficiently (if not exactly) aligned in time, delay estimation unit 44 reverts the sample rate(s) to their nominal values and may assert a blend signal (Blend). Responsive to receiving the blend signal, blend unit 17 may initiate the blend operation to transition from analog-sourced audio to digitally-sourced audio.

Figure 5:
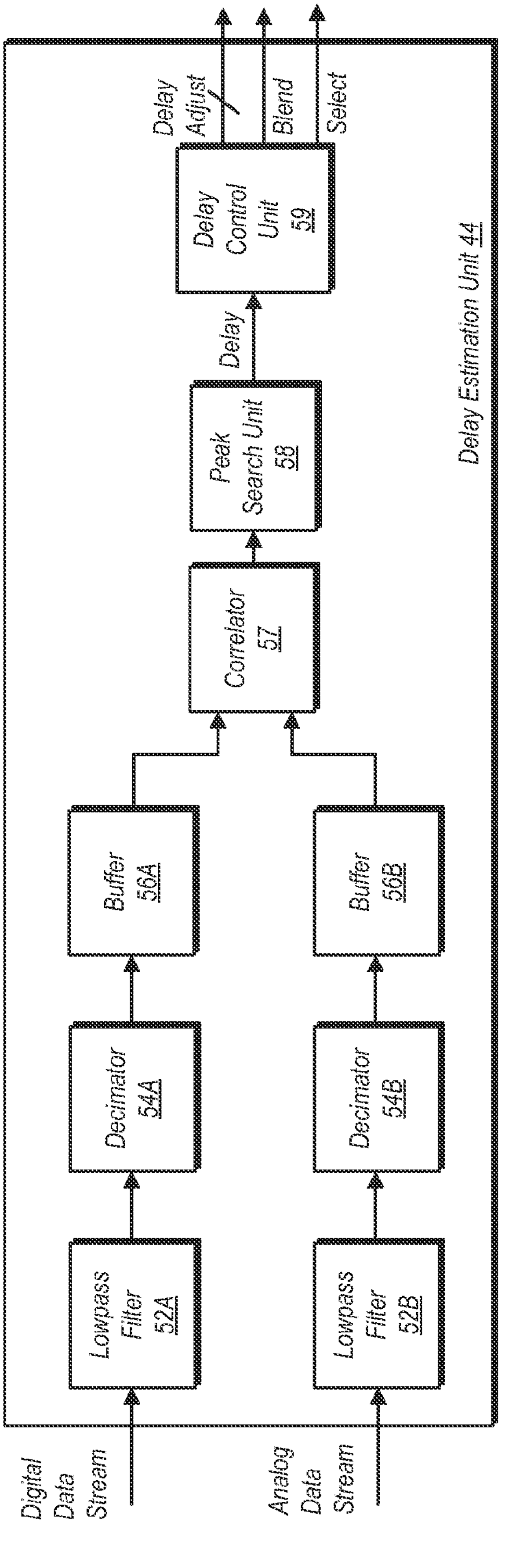
FIG. 5 is a block diagram of one embodiment of a dynamic delay estimator.

FIG. 5 is a block diagram illustrating one embodiment of delay estimation unit 44, which may be used to dynamically determine the relative delay between the analog and digital data streams. In the embodiment shown, delay estimation unit 44 includes a first low pass filter 52A coupled to receive the digital data stream. A second low pass filter 52B is coupled to receive the analog data stream. Low pass filters 52A and 52B are implemented as digital filters in this embodiment. It is noted that, in lieu of low pass filters, bandpass filters may be utilized. In either case, filtering may be performed to allow a lower portion of the audio spectrum to pass, while eliminating the upper portion of the audio spectrum in order to reduce the overall amount of data used in determining the relative delay between the analog and digital data streams.

In one embodiment, low pass filters 52A and 52B may have a cutoff frequency in the range of 40-60 Hz (e.g., 50 Hz). Low pass filtering (or bandpass filtering at a low portion of the audio spectrum) may reduce the amount of data to be processed in the delay estimation operation relative to processing the full 20 kHz of the audio spectrum. More particularly, by utilizing only a small, lower portion of the audio spectrum, the sampling rate may be reduced since the Nyquist frequency is lower. Thus, using the 50 Hz example, the Nyquist frequency (and thus the sampling rate) is 100 Hz, whereas the minimum sampling rate required for the 20 kHz audio spectrum is 40 kHz.

Low pass filter 52A may output a first filtered data stream to decimator 54A. Similarly, low pass filter 52B may output a second filtered data stream to decimator 54B. Decimators 54A and 54B may further reduce the amount of data to be processed in the delay estimation operation by eliminating samples. In the embodiment shown, decimators 54A and 54B may keep one of every N samples, wherein N is an integer greater than one (in one embodiment, N=200). Accordingly, decimators 54A and 54B may provide decimated data streams by outputting one of every N received samples. In general, the value of N may be computed by the formula $N<f_s/(2f)$, where $f_s$ is the sampling frequency (before decimation) and f is the corner frequency of the filter.

Data from the decimated data streams may be received by buffers 56A and 56B (corresponding to decimators 54A and 54B, respectively). In one embodiment, each of buffers 56A and 56B may be implemented as a FIFO. The reduction of the amount of data to be utilized in the delay estimation process, through low pass filtering and decimation, may in turn enable buffers 56A and 56B to be relatively small in relation to the storage space that would be required for a higher number of samples commensurate with processing a larger portion of the audio spectrum.

Each of buffers 56A and 56B is coupled to provide data from its respectively received decimated data stream to correlator 57. Correlator 57 may perform a digital correlation operation on the two streams of decimated data, the results of which may indicate the relative time alignment between the analog and digital data streams at a given point in time. More particularly, the correlation operation performed by correlator 57 may include multiplying together decimated data from each stream. The result of the multiplication may appear as noise, with a large peak when the data streams are aligned in time. Correlator 57 may also determine which of the analog and digital data streams is leading the other.

The output of correlator 57 may be a signed product received by peak search unit 58. In the embodiment shown, peak search unit 58 may analyze correlation results over time to search for peaks that indicate that the digital data streams are aligned in time. In some embodiments, a squaring function may square the product output by correlator 57 in order to further emphasize the peaks. Based on the received data, peak search unit 58 may output an indication of the relative delay between the analog data stream and the digital data stream. The indication of relative delay may include an indication of which one of the two data streams is leading the other.

The delay indication output by peak search unit may be received by delay control unit 59. Based on the received delay indication, delay control unit 59 may generate various control signals. In the embodiment shown, delay control unit 59 may generate delay adjustment signals (delay adjust) that may be provided to functional units in the path of one or both data streams to adjust their delay relative to each other. In some embodiments (as will be discussed below), delay control unit 59 may assert or de-assert a select signal based on the indicated delay in order to route the data streams into appropriate signal paths. Delay control unit 59 in the embodiment shown may also keep track of the delays applied and assert the blend signal upon receiving an indication that the relative delay between the analog and digital data streams is zero or is sufficiently small that a blend operation can be performed without generating audio artifacts.

Figure 6:
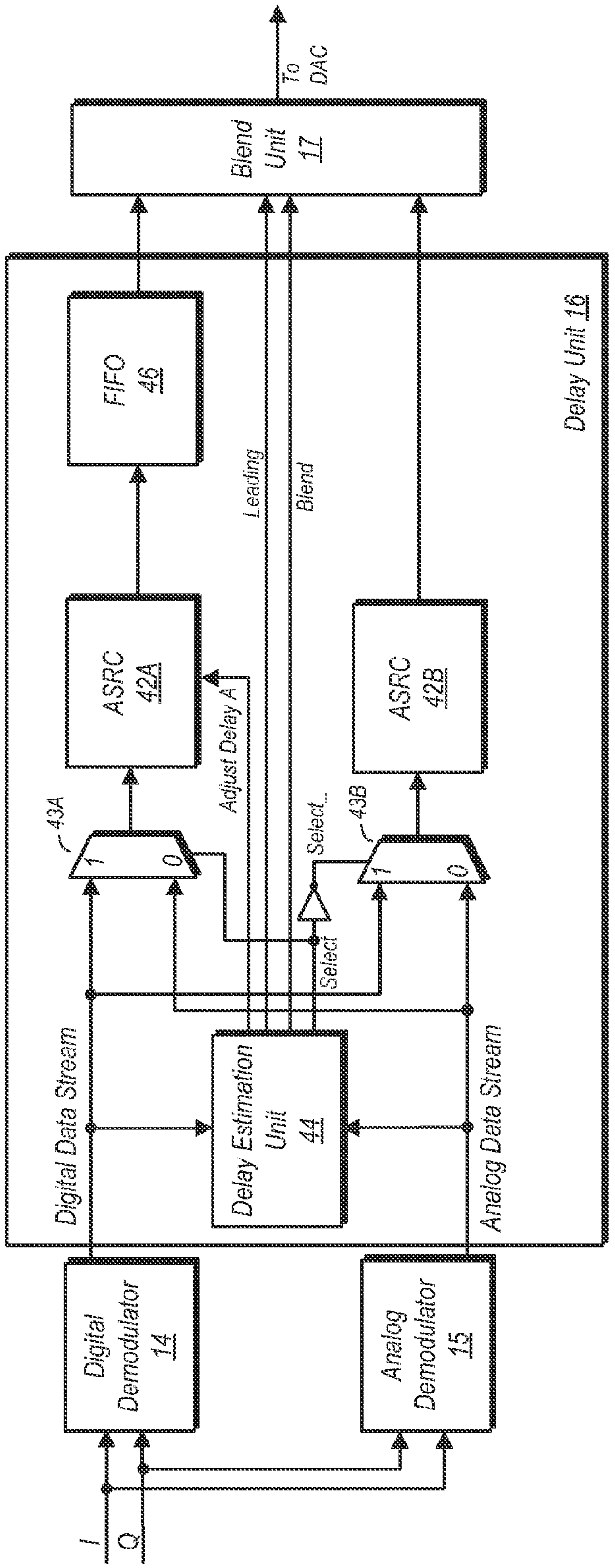
FIG. 6 is a block diagram of another embodiment of a dynamic time alignment unit.

FIG. 6 is a block diagram illustrating another embodiment of a delay estimation unit. In this particular embodiment, delay unit 16 implements only a single FIFO 46 (as opposed to having one in each data path). Furthermore, delay unit 16 in this embodiment implements two selection circuits 43A and 43B. The digital data stream may be provided to the '1' input of each of selection circuits 43A and 43B. The analog data stream may be provided to the '0' input of each of selection circuit 43A and 43B.

Delay estimation unit 44 in this embodiment may receive the digital and analog data streams directly from digital demodulator 14 and analog demodulator 15, respectively. Based on the determination of which data stream is leading in time, delay estimator 44 may assert or de-assert the selection signal (Select), causing its complement (Select)) to be driven to the opposite state. If the digital data stream is leading in this embodiment, delay estimator 44 may output the select signal as a logic 1, causing the digital data stream to be selected by selection circuit 43A and the analog data stream to be selected by selection circuit 43B. If the analog data stream is leading, the selection signal may be output as a logic 0, thereby causing selection circuit 43A to select the analog data stream and selection circuit 43B to select the digital data stream.

The leading data stream output from selection circuit 43A may be provided to ASRC 42A. Delay estimator 44 may provide adjustment signals (Adjust Delay A) to ASRC 42A in order to increase the delay in the path of the leading data stream until it is sufficiently aligned with the lagging data stream. The delay may be increased by reducing the sampling rate of ASRC 42A. The output of ASRC 42 may then be provided to FIFO 46. In turn, FIFO 46 may provide data from the leading data stream to blend unit 17 at its output sampling rate.

The lagging data stream output from selection circuit 43B may be provided to ASRC 42B. The output sampling rate of ASRC 42B may match that of blend unit 17. Accordingly, a FIFO is not utilized in this embodiment between the output of ASRC 42B and the corresponding input of blend unit 17. Delay estimation unit 44 in the embodiment shown is further coupled to provide the blend signal to blend unit 17 responsive to determining that the analog and digital data streams are sufficiently aligned in time.

Delay estimation unit 44 in this embodiment may also provide a signal or signals (Leading) indicating which of the analog and digital data streams is leading the other. Based on the state of the leading indication, blend unit 17 may determine which of the paths is providing the analog data stream and which is providing the digital data stream. Blend unit 17 may then utilize the data received from the path indicated as providing analog data stream to produce audio until the blend operation begins.

Figure 7:
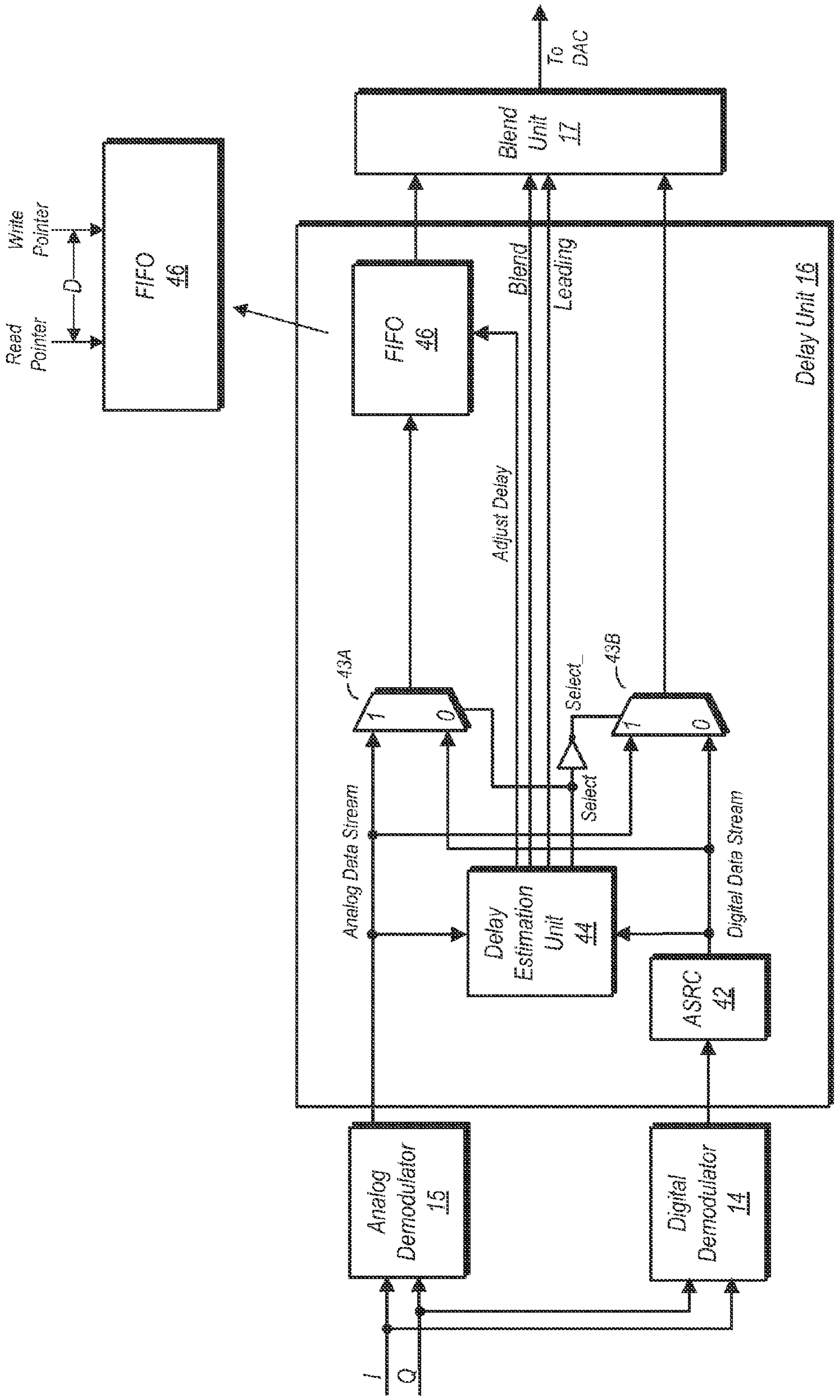
FIG. 7 is a block diagram of a third embodiment of a dynamic time alignment unit.

Another embodiment of a delay unit 16 is illustrated in FIG. 7. In this particular embodiment, delay unit 16 utilizes a single ASRC 42 and a single FIFO 46. In this embodiment, the output sampling rate of analog demodulator 15 matches the same of blend unit 15, while the output sampling rate of digital demodulator 14 does not. It is noted however that embodiments are possible and contemplated wherein the output sampling rate of digital demodulator 14 matches the output sampling rate of blend unit 17. Similarly, embodiments wherein the output sampling rate of analog demodulator 15 does not match the output sampling rate of blend unit 17 are also possible and contemplated.

In the embodiment shown, ASRC 42 may convert the sampling rate of the digital data stream, as received from digital demodulator 42, to that of blend unit 17. Delay estimator 44 may receive the analog data stream from analog demodulator 15, and the digital data stream at the converted sampling rate from ASRC 42. Delay estimator may determine which of the data streams is initially leading the other, as well as the amount of delay, and may set the selection and leading signals accordingly.

The leading data stream may be output by selection circuit 43A to FIFO 46. Delay estimation unit 44 may cause the delay of the leading signal to be adjusted in this embodiment by manipulating the circular distance between read and write pointers of FIFO 46. As seen in the diagram, the read and write pointers of FIFO 46 are separated by a circular distance D. Increasing the value of D may cause an increase in the amount of time data remains in FIFO 46, thereby increasing the delay applied to the leading data stream. Accordingly, the delay adjustment signal(s) generated by delay estimation unit 44 may change the read and write pointer separation for FIFO 46, and thereby change the delay applied to the leading data stream.

The output of FIFO 46 may be provided to blend unit 17 at its output sampling rate, as may the output of selection circuit 43B. Responsive to assertion of the blend signal by delay estimation unit 44, the blend operation may commence.

Figure 8:
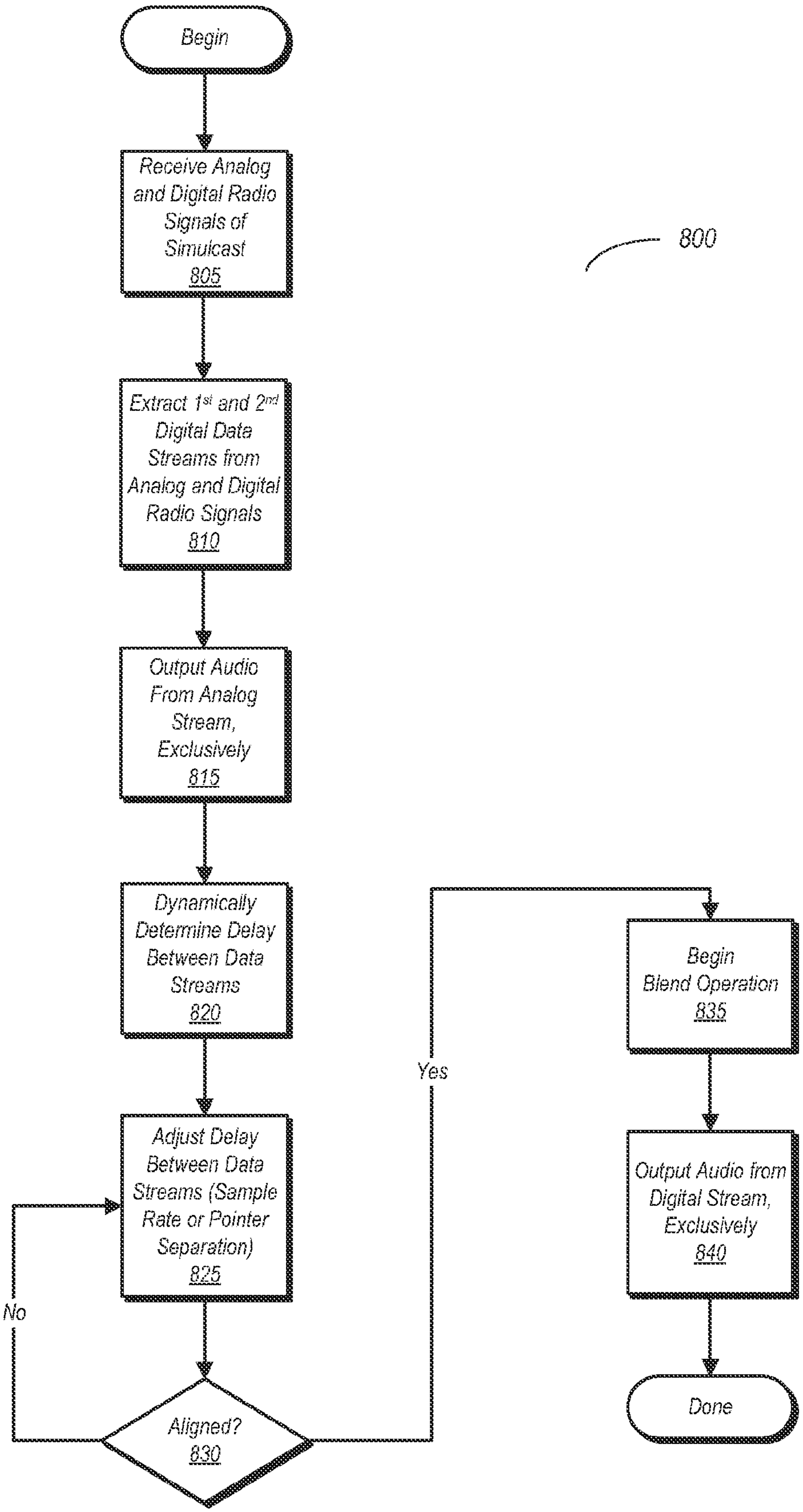
FIG. 8 is a flow diagram illustrating one embodiment of a method for dynamically aligning analog and digital programming received in a simulcast.

FIG. 8 is a flow diagram illustrating one embodiment of a method for dynamically aligning program content received from analog and digital radio signals in a simulcast. The methodology described herein may be implemented with the various embodiments of a radio receiver and delay unit as discussed above, and may be utilized with various other hardware and/or software embodiments not explicitly discussed herein.

Method 800 in the embodiment shown begins with the receiving of analog and digital radio signals of a simulcast (block 805). The simulcast signal may be similar to that illustrated in FIG. 3. Subsequent to receiving the simulcast signal, corresponding digital and analog data streams may be extracted from the digital and analog radio signals, respectively (block 810). Initial audio output may be provided from the analog data stream, exclusively (block 815).

Based on the information contained in the digital and analog data streams, a reception delay existing therebetween may be determined (block 820). Based on the amount of the reception delay, as well as a determination of which data stream is leading the other, the delay may be adjusted (block 825). The adjustment of the delay may be performed by adjusting the respective output sampling rates of one or more sampling rate converters in some embodiments, such as those described in conjunction with FIGS. 4 and 6. For embodiments similar to FIG. 7, delay adjustment may be performed by changing a circular separation between read and write pointers of a FIFO. Embodiments in which the delay of a data stream is adjusted by methods not explicitly described herein are also possible and contemplated.

If the two data streams are not sufficiently aligned in time (block 830), then the delay adjustment process of block 825 may continue. Once the two data streams are sufficiently aligned in time (i.e., there is a relative delay within a specified tolerance), a blend operation may begin (block 835). The blend operation may gradually increase the contribution of the digital data stream to the output audio while correspondingly reducing the contribution of the analog data stream. Upon completing the blend operation, audio may be output from the digital stream exclusively (block 840).

Figure 9:
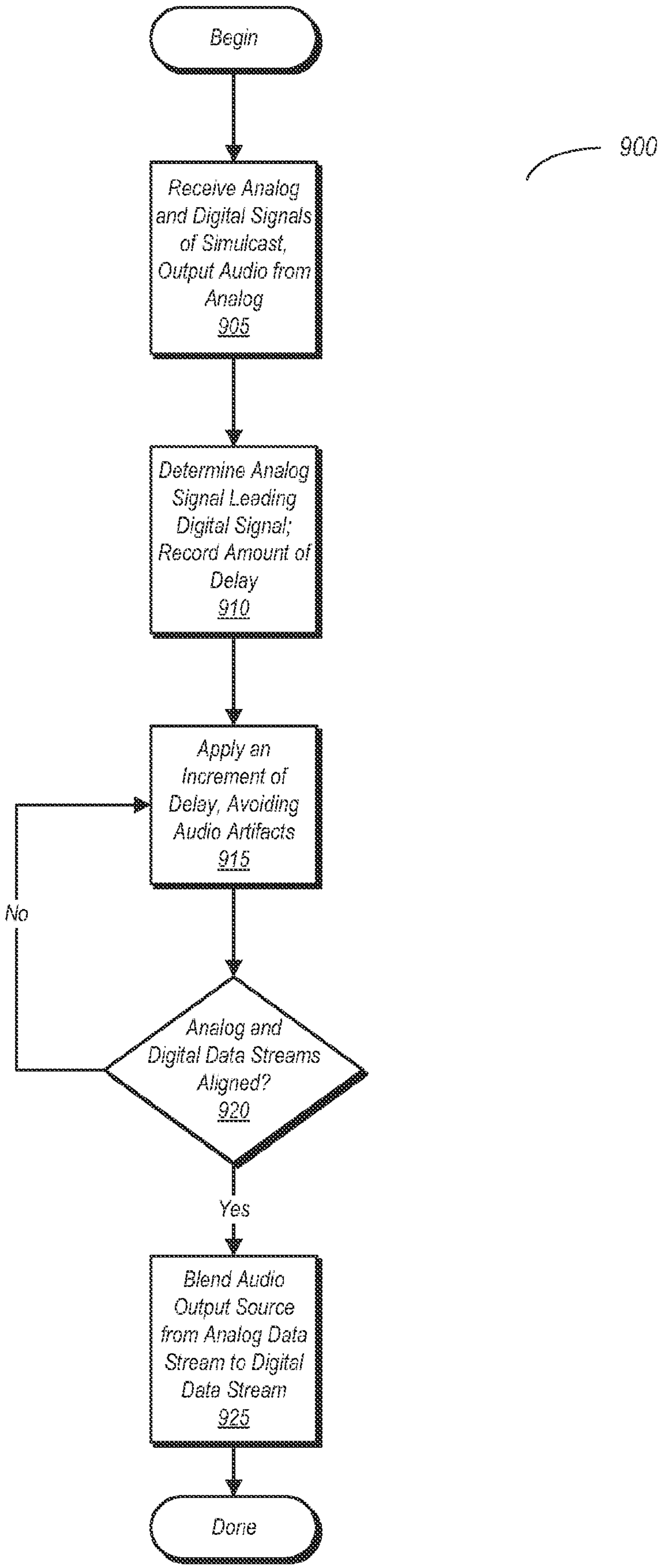
FIG. 9 is a flow diagram illustrating one embodiment of a method for aligning analog and digital programming when the analog signal initially leads the digital signal.

As noted above, upon initial reception of a simulcast signal, the audio may be sourced from the analog data stream. Thus, the case where the analog data stream leads the digital data stream may present a situation where the data stream providing the audio is also the data stream to which delay must be applied. If delay is applied suddenly or in large amounts, audio artifacts may be audible to a listener. Accordingly, FIG. 9 is a flow diagram directed to a method for delaying the analog data stream when it is initially leading without generating audio artifacts.

Method 900 begins with the reception digital and analog radio portions of a simulcast radio signal, and the initial outputting of audio based on the analog portion (block 905). The method further includes making a determination that the analog portion of the simulcast signal is leading the digital portion, and recording the amount of delay (block 910). The determination of which signal is leading and by how much may be made based on analysis of corresponding analog and digital data streams in a delay estimation unit, as described above with reference to FIG. 5. The initial amount of delay may be recorded and used for future reference if it is necessary to re-tune the receiver to the source of the simulcast radio signal.

The delay adjustment process may begin with applying an incremental amount of delay to the corresponding analog data stream (block 915). The amount of delay for a given increment may be small enough that audio artifacts detectable by a listener are avoided. For example, in one embodiment an increment of delay may be 20 milliseconds (ms) or less per second of audio, which may be undetectable to a listener. In general, the rate at which delay may be applied may be any rate that can be applied without producing audio artifacts detectable by a listener. Delay may be incrementally applied by any of the methods discussed above, as well as those not explicitly discussed herein. It is further noted that in some embodiments, delay may be applied in a continuous rather than incremental fashion.

If the analog and digital data remain misaligned (block 920, no), then another increment of delay is provided. This process may repeat itself a number of times, with the analog data stream being incrementally and gradually delayed using a rate that brings it into alignment with the digital data stream but avoids audio artifacts detectable by a listener.

Once the analog and digital data streams are sufficiently aligned (block 920, yes), a blend operation may begin (block 925). The blend operation may be conducted as previously described, reducing the contribution of the analog data stream to the output audio while correspondingly increasing the contribution of the digital data stream until the latter is the exclusive source.

Figure 10:
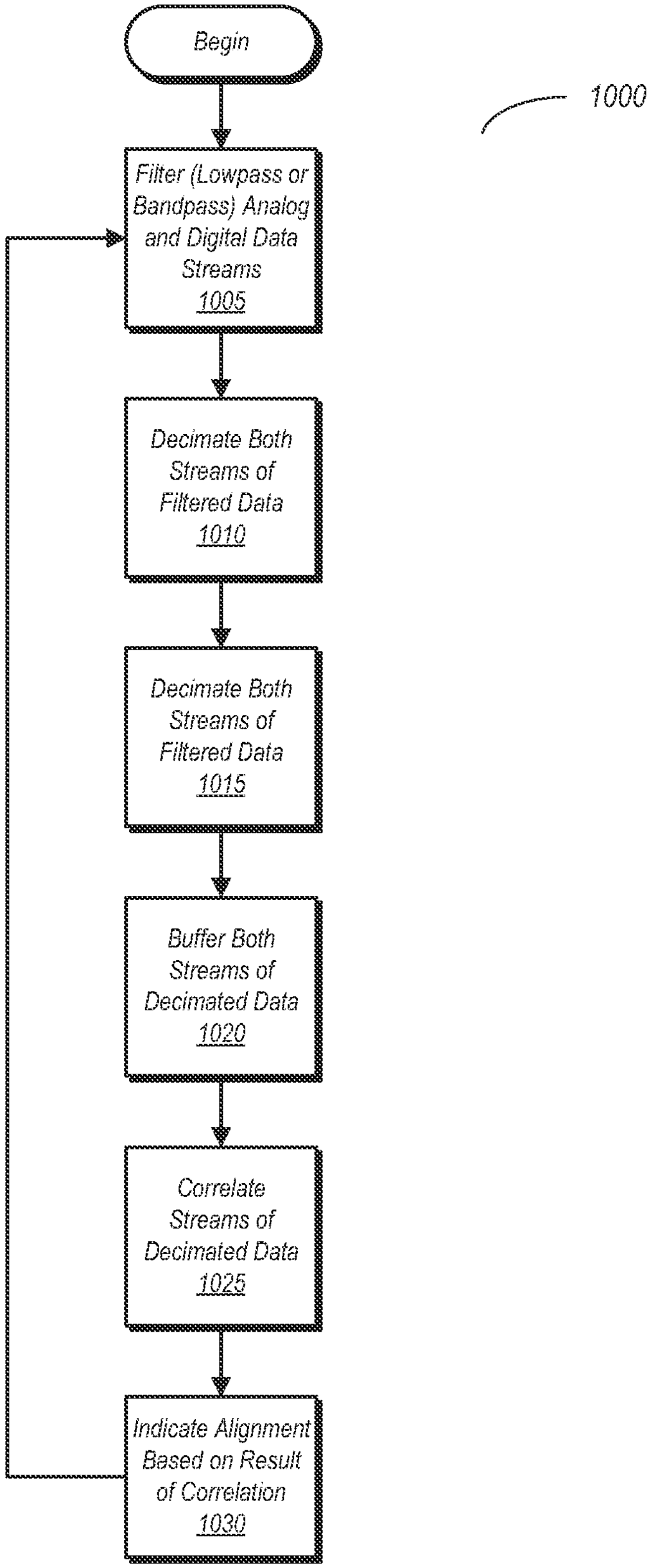
FIG. 10 is a flow diagram of one embodiment of a method for dynamically determining relative delay between two data streams extracted from a radio simulcast.

FIG. 10 is a flow diagram of one embodiment of a method for dynamically determining relative delay between two data streams extracted from a radio simulcast. Method 1000 may be implemented by the delay estimation unit 44 as shown in FIG. 5 and described herein. Other hardware embodiments, as well as software embodiments and combinations thereof may also be used to implement method 1000.

In the embodiment shown, method 1000 begins with the filtering of the analog and digital data streams to produce filtered data streams (block 1005). The filtering may allow data corresponding to a lower portion of the audio spectrum to pass, while rejecting data corresponding to higher frequencies. In one embodiment the filtering may be implemented using low pass filters, although bandpass filtering of a low portion of the audio spectrum is also possible and contemplated.

Subsequent to filtering, each of the filtered data streams may be decimated (block 1010). Decimation of the filtered data streams may be performed by reducing the number of samples, keeping only selected ones. In various embodiments, one of every N samples may be kept, while the decimation process may discard the remaining N−1 samples. Performing decimation on both streams of filtered data may result in corresponding streams of decimated data. The streams of decimated data may then be stored in respective buffers (block 1020). A correlator may receive the decimated data streams from each of the buffers, and may perform a correlation operation (block 1025). The correlation operation may determine which of the data streams is leading the other, as well as the amount of delay between them. Based on the results of the correlation, the alignment of the digital and analog data streams may be indicated (block 1030). Since the method is a dynamic method, it may return to block 1005 for incoming data, and may be continuously performed by the hardware and/or software in which it is implemented.

While the present disclosure includes reference to particular embodiments, it will be understood that the embodiments are illustrative and that the scope of the disclosure is not so limited. Any variations, modifications, additions, and improvements to the embodiments described are possible. These variations, modifications, additions, and improvements may fall within the scope of the inventions as detailed within the following claims.

What is claimed is:

1. An apparatus comprising:

a delay unit implemented in a radio receiver, wherein the delay unit is configured to receive a first data stream and a second data stream corresponding respectively to analog-transmitted and digitally-transmitted portions of a simulcast radio program, wherein the delay unit is further configured to determine an amount of an initial time lag between corresponding points of the first data stream and the second data stream;

wherein the delay unit, in response to determining that the second data stream lags the first data stream, is configured to increase an amount of delay applied to the first data stream until the first and second data streams reach a target time alignment, and wherein the delay unit is configured to increase the amount of delay at a rate that avoids audible artifacts in an audio output signal generated from the analog-transmitted portion of the radio program, and wherein the delay unit is further configured to store information indicative of the amount of the initial time lag between the first data stream and the second data stream and further configured to use the recorded initial time lag to re-tune the radio receiver to a source of the simulcast radio program.

2. The apparatus as recited in claim 1, wherein the delay unit is configured to incrementally increase the amount of delay applied to the first data stream.

3. The apparatus as recited in claim 2, wherein the rate is less than or equal to 20 milliseconds per second of audio.

4. The apparatus as recited in claim 1, wherein the delay unit is configured to change the delay by causing a change of a sampling rate of the first data stream.

5. The apparatus as recited in claim 1, wherein the delay unit is configured to change the amount of delay by changing a separation difference between a read pointer and a write pointer of a first-in first-out memory (FIFO).

6. The apparatus as recited in claim 1, further comprising a blend unit, wherein the blend unit is coupled to receive the first data stream and the second data stream, wherein the blend unit is configured to initially produce audio output exclusively from the first data stream, and wherein the blend unit is further configured to subsequently produce audio output exclusively from the second data stream in response to reaching the target time alignment.

7. The apparatus as recited in claim 6, wherein the blend unit is configured to:

transition from outputting only the first data stream for audio playback to outputting only the second data stream for audio playback, wherein said transitioning comprises reducing a first variable signal strength of audio sourced from the first data stream and correspondingly increasing a second variable signal strength of audio sourced from the second data stream.

8. A method comprising:

a delay unit of a radio receiver estimating a reception delay between corresponding points in first and second data streams extracted from analog and digital portions of a radio program, respectively;

in response to determining from the estimated reception delay that the first data stream leads the second data stream, the delay unit changing an internal delay on the first data stream from the estimated reception delay to a target delay at a rate that avoids audible artifacts;

storing in a memory information indicative of an initial value of the estimated reception delay; and re-tuning the radio receiver to a source of the radio program using the information indicative of the initial value of the estimated reception delay.

9. The method as recited in claim 8, further comprising a blend unit blending from the first data stream to the second data stream.

10. The method as recited in claim 9, wherein blending from the first data stream to the second data stream comprises:

transitioning from outputting only the first data stream for audio playback to outputting only the second data stream for audio playback, wherein said transitioning comprises reducing a first variable signal strength of audio sourced from the first data stream and correspondingly increasing a second variable signal strength of audio sourced from the second data stream.

11. The method as recited in claim 8, further comprising changing the internal delay of the first data stream incrementally.

12. The method as recited in claim 11, further comprising increasing the internal delay of the first data stream by a rate less than or equal to 20 milliseconds per second of audio until the target delay is reached.

13. The method as recited in claim 8, further comprising the delay unit causing the internal delay to change by causing a sample rate converter to change a rate at which the first data stream is sampled.

14. The method as recited in claim 8, further comprising the delay unit causing the internal delay to change by changing a separation of a read pointer and a write pointer of a first-in first-out memory coupled to receive the first data stream.

15. A method, comprising:

a radio receiver receiving a radio program that includes content broadcast as an analog radio signal and the content broadcast as a digital radio signal;

the radio receiver generating a first data stream from the analog radio signal and a second data stream from the digital radio signal;

the radio receiver estimating a reception delay between corresponding points of the first and second data streams;

in response to estimated reception delay indicating that the first data stream leads the second data stream, the radio receiver changing an internal delay of the first data stream to a target delay at a rate that avoids audible artifacts in an audio output of the radio receiver;

storing information indicative of an initial value of the reception delay in a memory; and re-tuning the radio receiver to a source of the radio program using the information indicative of the initial value of the reception delay.

16. The method as recited in claim 15, further comprising:

the radio receiver initiating a blend operation in response to the internal delay reaching the target delay, wherein the blend operation includes gradually transitioning from generating the audio output based exclusively on the first data stream to generating the audio output based exclusively on the second data stream.

17. The method as recited in claim 15, further comprising changing the internal delay of the first data stream in increments.

* * * * *